(12) United States Patent
Müller et al.

(10) Patent No.: US 6,374,712 B1
(45) Date of Patent: Apr. 23, 2002

(54) DISK MILLING CUTTER AND SUITABLE INDEXABLE INSERT

(75) Inventors: Gebhard Müller, Fürth; Horst Jäger, Nürnberg, both of (DE)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/521,134

(22) Filed: Mar. 8, 2000

Related U.S. Application Data

(63) Continuation-in-part of application No. PCT/EP98/05374, filed on Aug. 25, 1998.

(30) Foreign Application Priority Data

Sep. 9, 1997 (DE) .......................................... 197 39 366

(51) Int. Cl.⁷ .............................. B23B 1/00; B23C 5/20
(52) U.S. Cl. .............................. 82/1.11; 82/47; 407/34; 407/56; 407/70
(58) Field of Search .............................. 407/34, 35, 43, 407/53, 54, 56, 58, 70; 82/1.11, 4.6, 4.7

(56) References Cited

U.S. PATENT DOCUMENTS 4,097,174 A * 6/1978 Heinlein ...................... 407/46
5,037,248 A * 8/1991 Heffron ....................... 407/12
6,050,757 A * 4/2000 Gesell ........................ 409/132

FOREIGN PATENT DOCUMENTS

| DE | 2639890 A1 | * 3/1978 |
| DE | 3922963 | 4/1991 |
| DE | 19519951 | 12/1996 |
| EP | 0156780 | 10/1985 |
| JP | 9-309019 | * 12/1997 |
| WO | 9639269 | 12/1996 |

* cited by examiner

Primary Examiner—Henry Tsai
(74) Attorney, Agent, or Firm—Nils H. Ljungman & Associates

(57) ABSTRACT

A side milling cutter with cutting inserts, by which side milling cutter a crank pin can be cut with a single feed motion. The plate-shaped cutting inserts are arranged on the periphery of the side milling cutter alternating between the left and right side in a peripheral direction, and are oriented essentially radially with their cover surfaces in relation to the cutter axis, which cover surfaces contain the tool faces. The cutting inserts are also arranged so as to form a gap on the periphery of the cutter which is so narrow that the length of the arc of action between the point of entry and the point of exit of cutting is greater than the half of the gap of the arrangement of cutting inserts on the periphery of the cutter. The present invention also relates to the configuration of the cutting inserts as indexable inserts which can be used on the left and on the right.

20 Claims, 12 Drawing Sheets

B-B

A-A

A-A

B-B

A-A

B-B

C-C

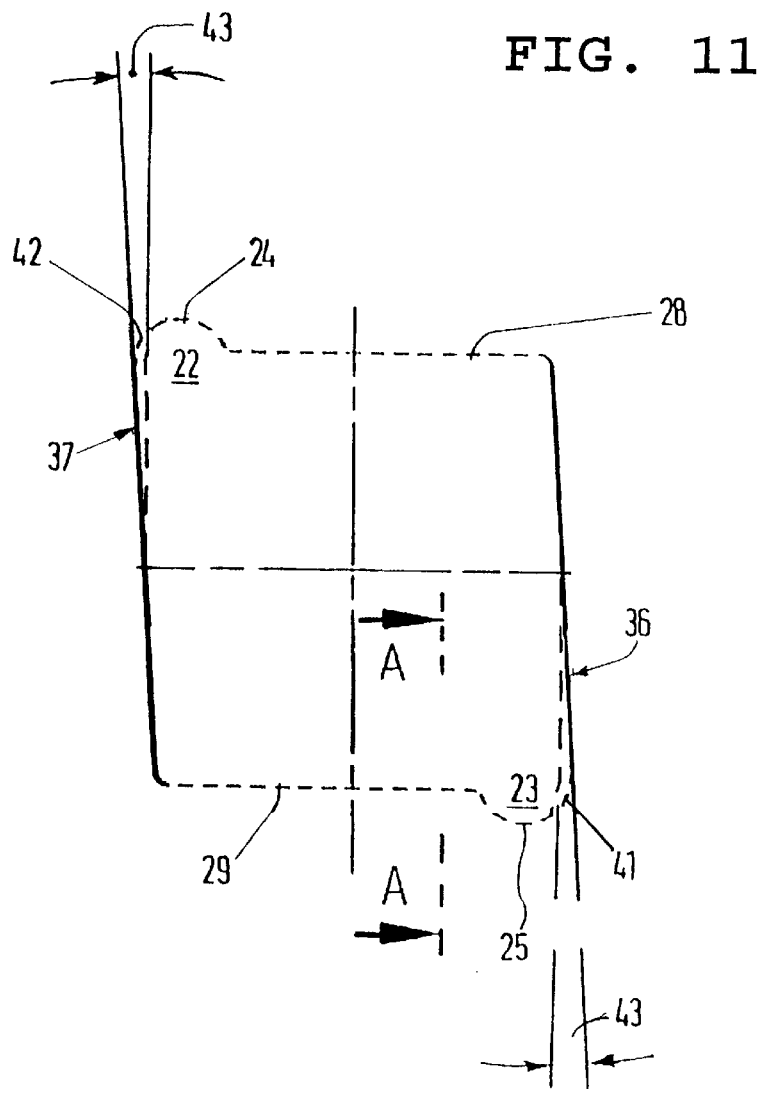
FIG. 11
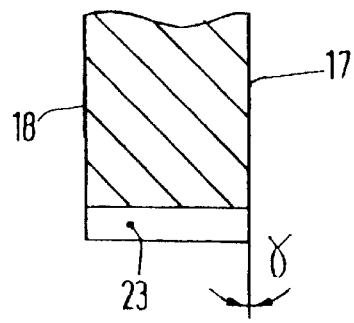
FIG. 11A  A-A

DISK MILLING CUTTER AND SUITABLE INDEXABLE INSERT

CONTINUING APPLICATION DATA

This application is a Continuation-In-Part application of International Patent Application No. PCT/EP98/05374, filed on Aug. 25, 1998, which claims priority from Federal Republic of Germany Patent Application No. 197 39 366.7, filed on Sep. 9, 1997. International Patent Application No. PCT/EP98/05374 was pending as of the filing date of the above-cited application. The United States was an elected state in International Patent Application No. PCT/EP98/05374.

BACKGROUND OF THE INVENTION

1. Field of the Invention

The present invention relates first of all to a disk milling cutter for the milling of a crankshaft journal, including the two oil collar cheeks associated with it, and of recesses that act as oil grooves between the oil collar cheeks, with plate-shaped cutting inserts on its milling cutter periphery in the peripheral direction on its left and right sides.

2. Background Information

Using such disk milling cutters, crankshaft journals are machined as the workpiece is driven synchronously so that it rotates around its axis, together with both associated oil collar cheeks and together with the recesses in between that act as oil grooves, flank the cylindrical journal surface on both sides and maintain an appropriate distance from the oil collar cheeks. This milling is appropriately done using a single feed motion of the disk milling cutter, i.e. in one single operating process. The disk milling cutter is equipped or studded on its periphery in the peripheral direction, alternately on the left and right sides, with plate-shaped cutting inserts. On the disk milling cutter claimed by the present invention, the cutting inserts with their cover surfaces that contain the faces or chip faces are oriented essentially radially with respect to the axis of the milling cutter.

Crankshaft journals generally have only a limited diameter. The curvature of the surface of the crankshaft journals to be formed by the milling cutter into a cylindrical jacket is correspondingly severe. Consequently, on conventional disk milling cutters for this application only one milling cutter cutting edge is engaged at a time. This engagement occurs alternately on the left and on the right sides of the periphery of the disk milling cutter. This type of operation causes rough operation, which in turn results in the risk of an adverse effect on the surface quality.

OBJECT OF THE INVENTION

The initial object of the present invention is therefore to improve the smoothness of operation of the disk milling cutter and thus to optimize the result of the milling operation.

SUMMARY OF THE INVENTION

The present invention teaches that the cutting inserts can be located on the periphery of the milling cutter with such close spacing, or narrow or tight pitch, that the length of the arc of contact between the beginning of the cut and the end of the cut of a cutting insert on the crankshaft journal is greater than one-half the spacing of the arrangement of the cutting inserts on the periphery of the milling cutter. In this context, one whole space, pitch, or spacing can be defined, either on the left side or on the right side of the periphery of the milling cutter, as the distance between two sequential cutting inserts in the peripheral direction of the milling cutter. The present invention consequently can make possible such a close spacing that the length of the arc of contact of the milling cutter is greater than one-half the milling cutter spacing on its right or on its left side. The length of the arc of contact is defined as the arc that is traveled by each milling cutter cutting edge between the beginning of the cut and the end of the cut on the crankshaft journal. Because the cutting inserts that are located on the left and right sides on the periphery of the milling cutter can be offset from each other by one-half space, which means that the left cutting inserts are in the centers of the spaces between the cutting inserts that are located on the right side (and vice versa), one-half of the space equals the peripheral arc of the milling cutter between a cutting edge on the left side and a neighboring cutting edge on the right.

The present invention teaches that more than just one cutting edge can essentially always be in contact with the workpiece. Thus there can be a cutting force load that is always pulsating between a bottom value and a top value. There are essentially no loads that alternate between zero and maximum. This feature is also an advantage in terms of machine dynamics and promotes a longer useful life of the equipment.

In at least one possible embodiment according to the present invention, the cutting force load can be kept substantially constant by the precise spacing of the cutting inserts. The precise spacing, as discussed above, can permit more than one cutting insert to be in contact with the workpiece, i.e. the crankshaft, in order to achieve a substantially smooth operation of the disk milling cutter. The smooth operation can essentially avoid the undulations or vibrations caused by the application of uneven cutting force loads. In at least one possible embodiment, the inserts can be spaced so that, during operation of the disk milling cutter, the preceding cutting insert, in the direction of rotation of the milling cutter, will disengage from the crankshaft while the following cutting insert, which is preferably located on the opposite side of the periphery of the milling cutter, begins engaging the crankshaft. Further, the degree of force applied by the preceding cutting insert can begin to decrease during disengagement, while the degree of force applied by the following cutting insert can begin to increase during disengagement at a rate and amount preferably substantially equivalent to the rate and amount of decrease of the force during disengagement of the preceding cutting insert. This balance between decreasing and increasing cutting force loads can provide for a substantially smooth operation of the milling cutter by substantially eliminating unbalanced force loads that can cause vibrations or undulations in the milling process.

In at least one further possible embodiment according to the present invention, the cutting inserts may not alternate from side to side about the periphery and may all be substantially similar in position.

In at least one other possible embodiment according to the present invention, the diameter of the workpiece to be machined, the diameter of the disk milling cutter, the spacing of the cutting inserts, and the depth at which the inserts are to cut into the workpiece all must be precisely calculated and measured for substantially optimal performance during the milling process. Each one of these measurements affects each one of the other measurements. If, for example, the cutting inserts were spaced improperly with relationship to the workpiece, unbalanced cutting force loads could occur.

If the spacing were too small, the cutting force applied by the multiple inserts contacting the workpiece could cause an improper cut. If the spacing were too large, only one insert may contact the workpiece at any given time, which could also result in variations in the cutting force load from none to maximum, and thereby cause rough or imprecise cuts.

The disk milling cutter as described by the present invention takes advantage of the low wear on the peripheral length of the disk milling cutter by each individual cutting insert. This low wear on the peripheral length is made possible by the exclusive use of plate-shaped cutting inserts, which with their cover faces form a face or chip face and thereby—with reference to their plate-shaped configuration—can be oriented essentially radially on the periphery of the milling cutter. In one embodiment, the present invention teaches a disk milling cutter of a type in which the milling cutter can be equipped both on the left side and on the right side of its periphery with identically configured cutting inserts, which also—regardless of whether it is used on the left side or on the right side of the periphery of the milling cutter—are realized in the form of indexable cutting inserts, which make available cutting edges that can be placed in more than one cutting position. The cost advantages of using such indexable cutting inserts are generally known. In this document, when the term "indexable insert" is used, it should be understood in the sense of a "double indexable insert" because the indexing capability makes it possible to use the same insert on the left side and also on the right side of the milling cutter, and the other rotation is available for an additional cut on the left or on the right side. The term "cutting edge" as used here relates to a complete reproducing or matching, namely a combined or otherwise dual-function diameter and recessing cutting edge, which either on the left or on the right side of the crankshaft journal creates the complete final shape with a single feed motion. All these capabilities are made possible in a disk milling cutter according to at least one embodiment of the present invention, wherein each of the cutting inserts is an indexable insert with at least two cutting edges on the same side of the milling cutter that can be brought into the cutting position one after the other, and wherein each cutting insert is shaped and indexable so that it can be used on the same disk milling cutter both on its left side as well as on its right side.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention further relates to the more detailed configuration of the general indexable cutting inserts described above for the intended use described above. Claim 3 discloses their basic configuration. The indexable cutting insert is characterized by a series of variant configurations, which are described in greater detail below with reference to the exemplary embodiments illustrated in the accompanying figures, in which:

DESCRIPTION OF THE PREFERRED EMBODIMENT

The disk milling cutter 1, which is illustrated only in the form of a peripheral segment, is used to mill the workpiece, a crankshaft journal 2, in a single feed motion, together with the two oil collar cheeks 3, 4 and with the recesses 5, 6 (FIGS. 2, 6) acting as oil grooves, between them.

Figure 1:
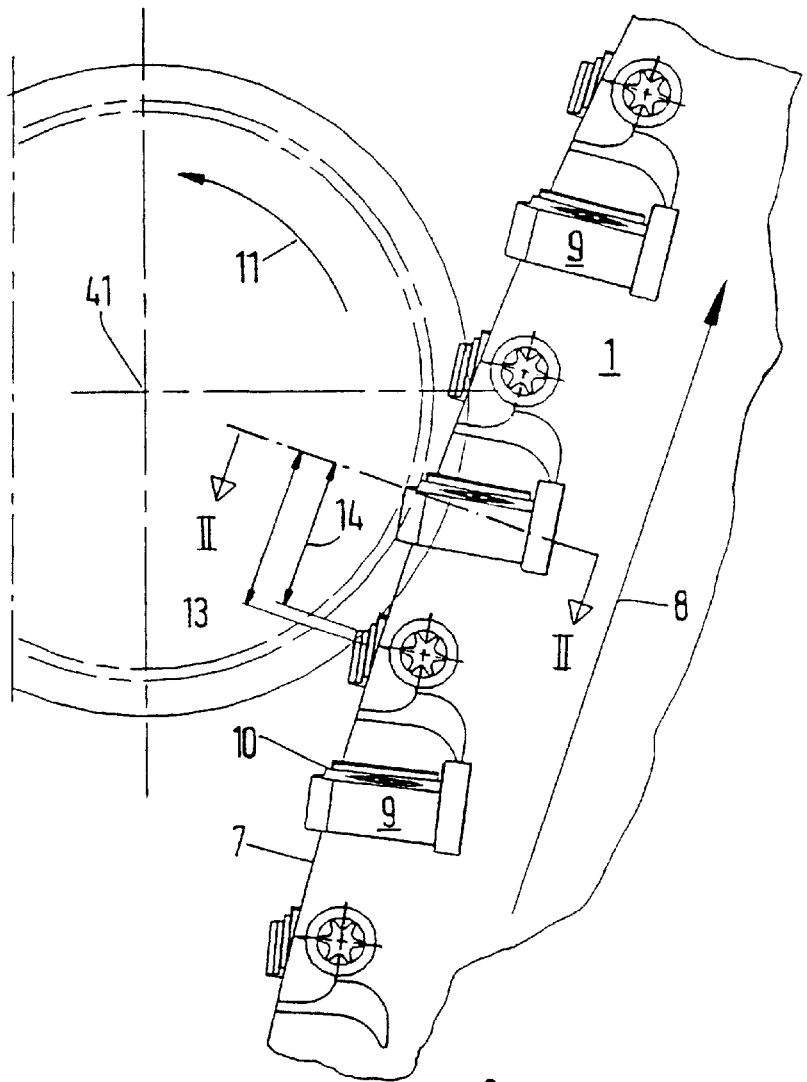
FIG. 1 is a schematic side view of the journal milling process which takes place in synchronization on the basis of a peripheral segment of the milling cutter which is located in the journal periphery in the contact position.

The disk milling cutter 1 is equipped on its periphery 7 in the peripheral direction or direction of rotation 8 alternately on its left and right sides with plate-shaped cutting inserts 9, which are oriented with their tool faces 10 containing the faces or chip faces essentially radially to the milling cutter axis (not shown). The machining of the crankshaft journal is preferably done in synchronization or climb milling or cut down milling. The direction of rotation 11 of the workpiece is therefore in the same direction as the direction of rotation 8 of the disk milling cutter, as shown in FIG. 1.

Figure 3:
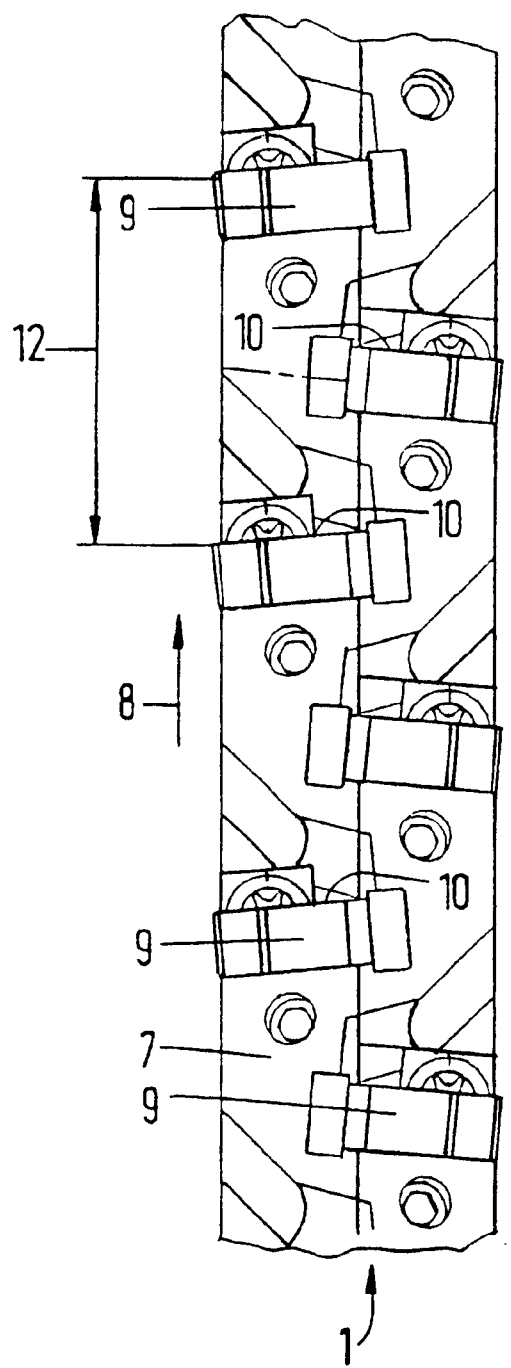
FIG. 3 is a plan view of the peripheral segment of the disk milling cutter as shown in FIG. 2.

The cutting inserts 9 are located at a spacing 12 (FIG. 3) uniformly on the periphery 7 in the peripheral direction 8 on the left and on the right side of the milling cutter. The location of the cutting inserts 9 on the left side is symmetrical and offset by one-half a space 12 with respect to the location on the right side (FIG. 3). The spacing 12 is tight enough that the length 13 of the arc of contact between the beginning of the cut and the end of the cut of the cutting insert 9 on the workpiece 2 is greater than one-half the spacing 14 of the arrangement of the cutting inserts 9 on the periphery of the milling cutter 1.

The cutting inserts 9 are indexable inserts with at least two cutting edges 15, 16 which can be brought into the cutting position one after the other on the same side of the milling cutter. To emphasize their characteristic as a closed, completely reproducing cutting edge, they are highlighted by cross-hatching in the figures, although they of course form continuous, visible cutting edges.

Figure 2:
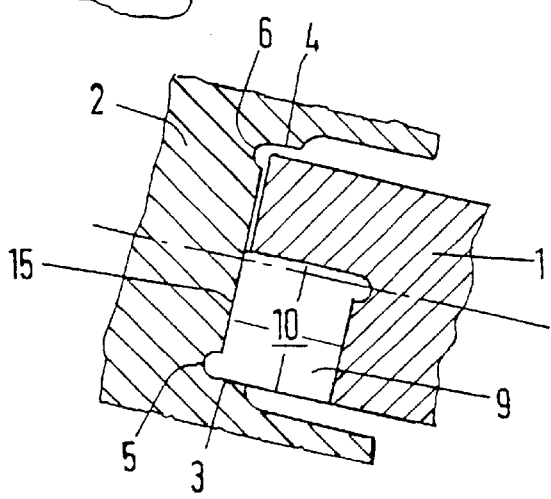
FIG. 2 shows a cross section along Line II—II in FIG. 1, whereby the completely reproducing cutting edge of the cutting insert is shown in cross section by the broken line, although it forms a continuous cutting edge.
Figure 4:
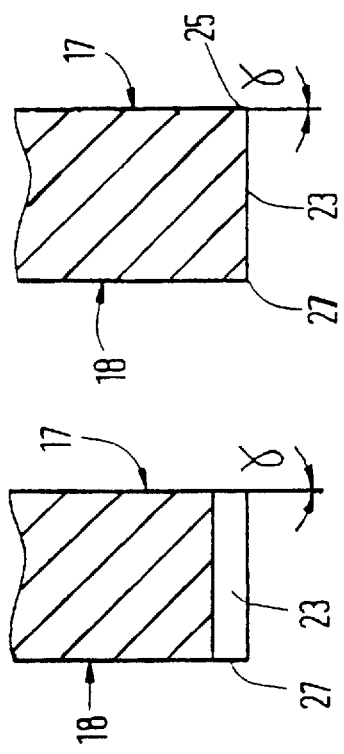
FIG. 4 shows one exemplary embodiment of the indexable cutting body for the disk milling cutter in an overhead view, and in three partial sections A—A, B—B and C—C, shown in FIGS. 4A, 4B, and 4C respectively. In the overhead view, in turn, the closed completely reproducing cutting edges are shown in broken lines, although they are one continuous, visible edge.
Figure 4:
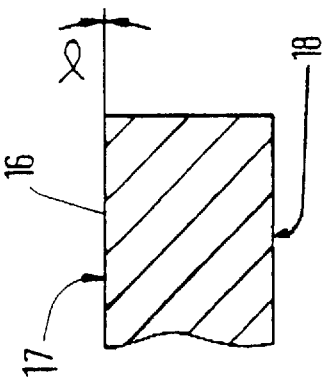
Figure 4:
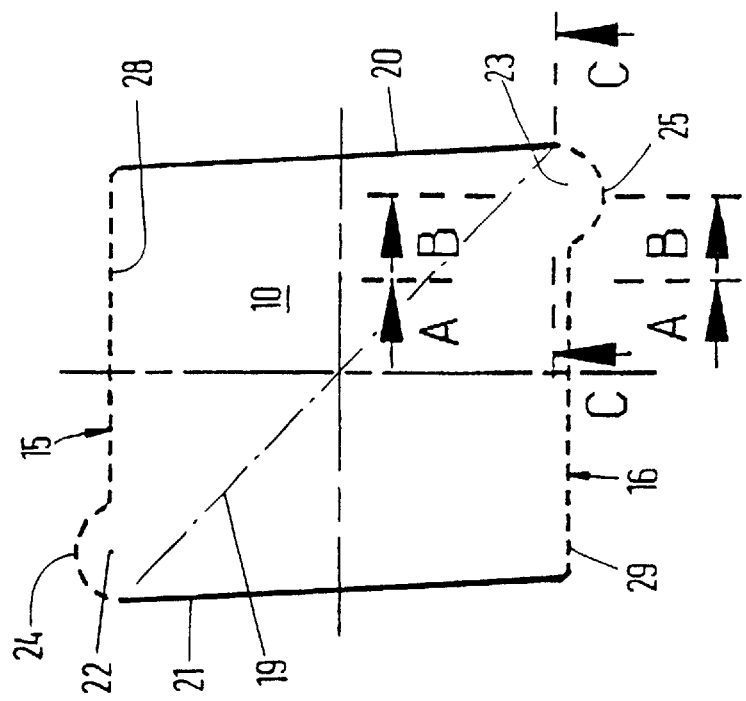

Each cutting insert 9 is provided with a peripheral contour of its cover faces 10 which contain the cutting faces such that a cutting insert always shapes one half of the crankcase journal 2 with its neighboring oil collar cheek 3 or 4 and the recess 5 or 6 between them. Each cutting insert 9 is illustrated in the vicinity of its two cover faces, of which only the upper, visible cover face 10 is shown in FIGS. 2 and 4, with two closed completely reproducing cutting edges 15, 16. Each cutting insert 9 therefore carries a total of four cutting edges 15, 16. Two of these cutting edges are thereby suitable or designed for use on the left side and two for use on the right side of the periphery 7 of the milling cutter 1.

The basic shape of the indexable insert used as the cutting insert 9 is illustrated in FIGS. 4, 4A, 4B, and 4C. This indexable insert is characterized by the approximate shape of a cuboid with somewhat rhombus-shaped or diamond-shaped or rhomboid cover surfaces which contain the chip faces 17, 18, the cover face of which, viewed from above, is numbered 10. The vertical or standing or projecting plate corners in the direction of the longer rhombus diagonal 19 (FIG. 4) each have, in an extension of the two facing cover face sides, each of which forms a cutting edge 20, 21, a lug-like carrier projection 22 and 23 respectively with a recessing cutting edge 24, 25 to form a recess 5, 6 on the crankshaft journal 2. The carrier projections 22, 23 are also active on the side opposite the illustrated cover face 10, namely in the vicinity of the chip face 18, as the carrier of a recessing cutting edge 26 and 27 (FIGS. 4A and 4B) respectively located there. Each cutting edge 15, 16 of one of the two cover faces 10 of the cutting insert 9 therefore forms—and in the exemplary embodiment illustrated in FIG. 4 they merge into each other—a recessing cutting edge 24 or 25 and adjacent to it a diameter cutting edge 28 or 29, and analogously on the underside of the indexable insert a recessing cutting edge 26 or 27 and a diameter cutting edge 30 or 31.

Figure 5B:
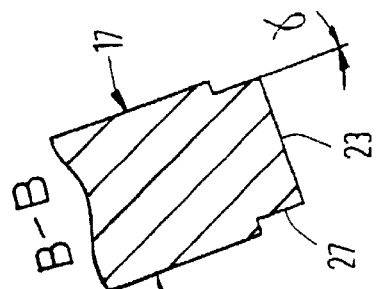
FIG. 5 shows, in a plan view, in a side view and in two partial sections A—A and B—B, shown in FIGS. 5A and 5B respectively, a modified exemplary embodiment of the indexable insert. Here again, the information relating to FIGS. 2 and 4 above also applies to the cutting edges illustrated in broken lines.
Figure 5A:
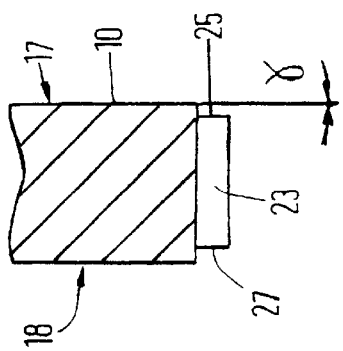

The clearance faces 32 (FIG. 5A) of the cutting inserts 9 form a right angle with the cutting or chip surfaces 16, 18. In the exemplary embodiment illustrated in FIG. 4, each diameter cutting edge 28, 29 makes a continuous transition into the associated recessing cutting edge 24 or 25. The two cutting edges lie in the same cover face 10 or in the same chip face 17, 18. The cutting rake γ is 0 degrees. Standing in the cut it is negative.

In contrast to the cutting insert 9 illustrated in FIG. 4, on the cutting insert 9 illustrated in FIGS. 5, 5A, 5B, and 5C, the recessing cutting edges 24, 25 and 26, 27 are each stepped underneath the corresponding diameter cutting edges 28, 29 or 30, 31. The respective, completely matching overall cutting edge 15, 16 is thereby formed by a diameter cutting edge 28, 29 or 30, 31 and by a recessing cutting edge 24, 25 or 26, 27 which is recessed with respect to it opposite to the direction of rotation 8. The overall cutting edge 15 or 16 is divided or split. Therefore, there is a splitting of the cutting force into two smaller parts, which do not reach their peak levels simultaneously. Thus lower cutting force plays or clearances are achieved. This is an effective active geometry with, once again, a negative cutting rake γ of 0 degrees.

Figure 9:
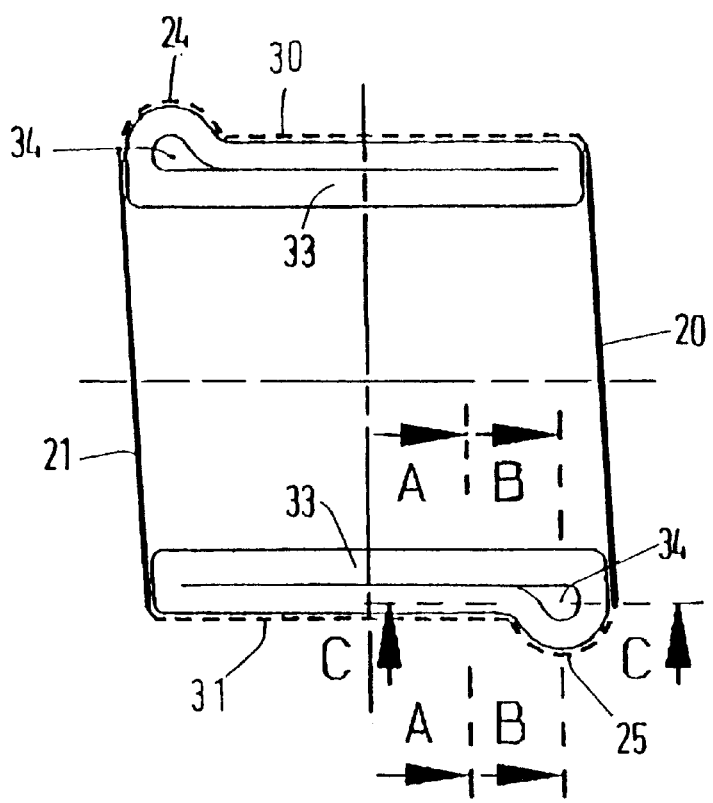
FIG. 9 is a plan view, and in three partial sections A—A, B—B and C—C, shown in FIGS. 9A, 9B, and 9C respectively, with enlarged details X, Z, and Y, shown in FIGS. 9D, 9E, and 9F respectively, of an additional modified exemplary embodiment of an indexable insert, basically of the type illustrated in FIG. 4. Here again, the comments made with regard to FIGS. 2 and 4 relate to the cutting edges illustrated in broken lines.
Figure 9A:
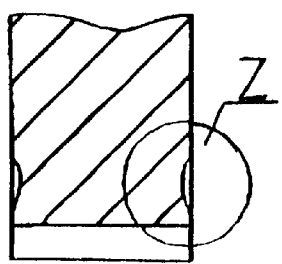
Figure 9B:
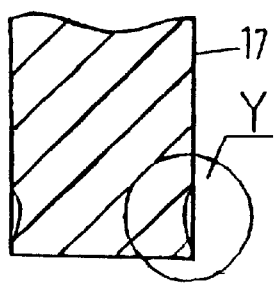
Figure 9C:
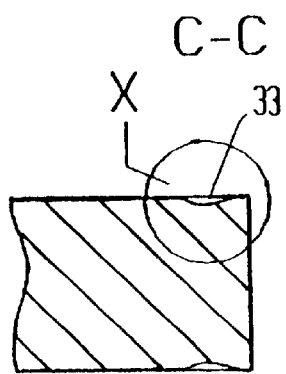
Figure 9D:
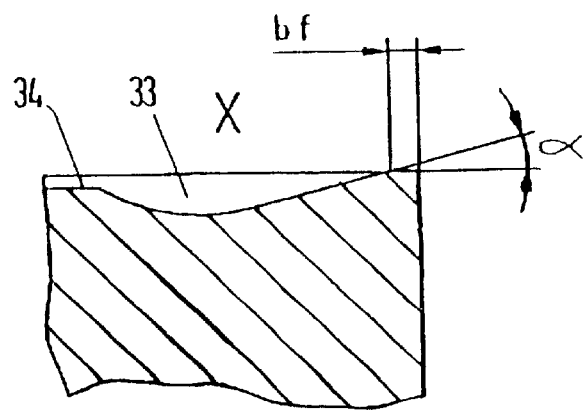
Figure 9E:
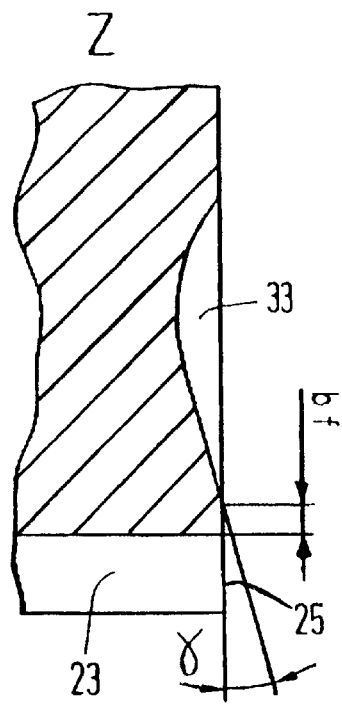
Figure 9F:
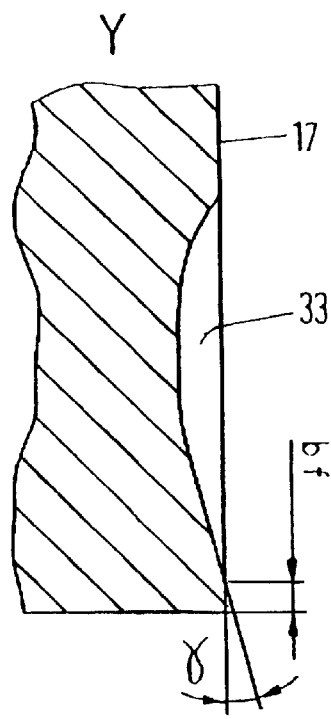

The cutting insert illustrated in FIG. 9 represents a modification of the cutting insert illustrated in FIG. 4, to the extent that each cutting edge 15, 16, consisting of a diameter cutting edge 28, 29 or 30, 31 and a recessing cutting edge 24, 25 or 26, 27 which merge seamlessly into each other, is provided with a chip forming shoulder 33 for the formation of positive cutting edges. The chip forming shoulder 33 has a trough-shaped or hollow cross section. The cutting rake γ is therefore positive. The trough-shaped cross section of the chip forming shoulder is shown in sectional drawings A—A (FIG. 9A), B—B (FIG. 9B) and C—C (FIG. 9C), in which the areas Z (FIG. 9E), Y (FIG. 9F) and X (FIG. 9D) are shown on an enlarged scale. It is therefore apparent that in the vicinity of the recessing cutting edges 24, 25 in the chip discharge direction behind the chip forming shoulder 33, an island-like plateau surface 34 is formed which is recessed with respect to the chip face 17 or 18. The cutting rake γ, which is associated with the cutting edge 20 or 21, is also positive. The cutting insert with a chip shaping shoulder along the entire cutting edge as illustrated in FIG. 5 is particularly well suited for materials that form long chips, as well as for a reduction of cutting and passive forces. There is an effective active geometry with positive cutting rakes on the diameter cutting edges and on the recessing cutting edges.

Figure 10:
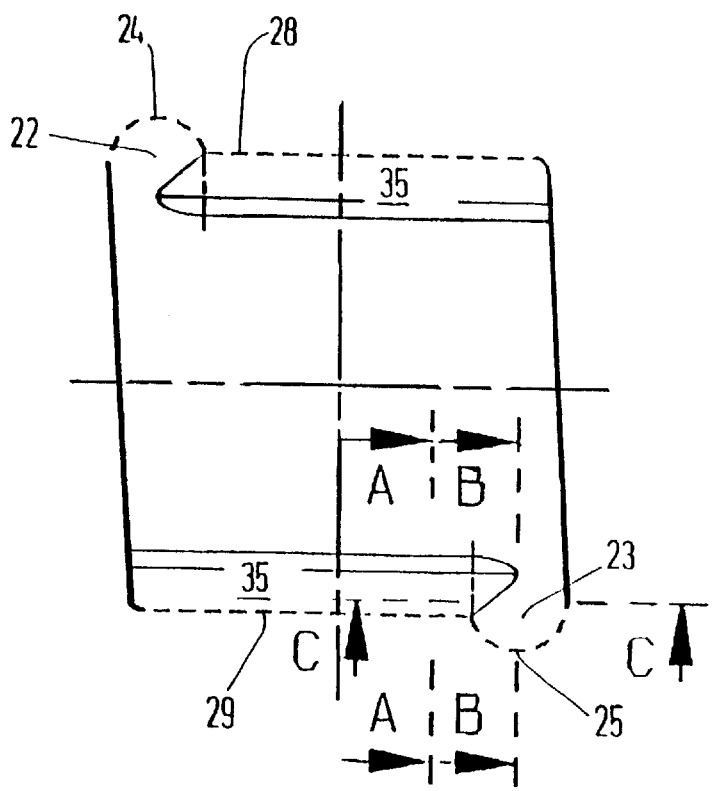
FIG. 10 shows an additional modified exemplary embodiment of an indexable insert that has the basic design illustrated in FIG. 4, as well as three partial sections A—A, B—B and C—C, as shown in FIGS. 10A, 10B, and 10C respectively, as well as enlarged details Z and X, as shown in FIGS. 10E and 10D respectively. Here again, the comments made with regard to FIGS. 2 and 4 relate to the cutting edges illustrated in broken lines.
Figure 10A:
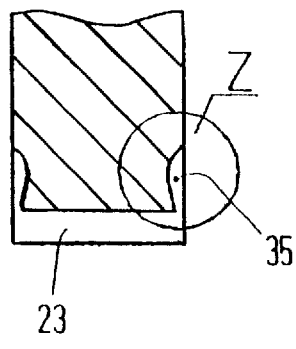
Figure 10B:
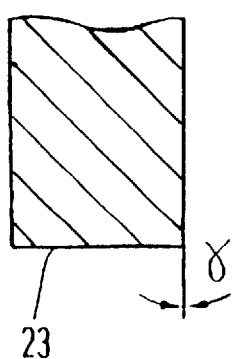
Figure 10C:
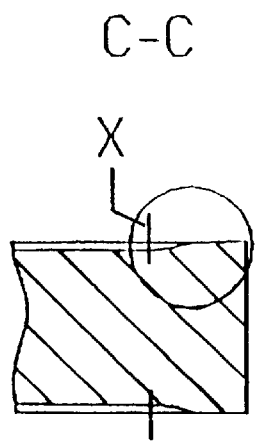
Figure 10D:
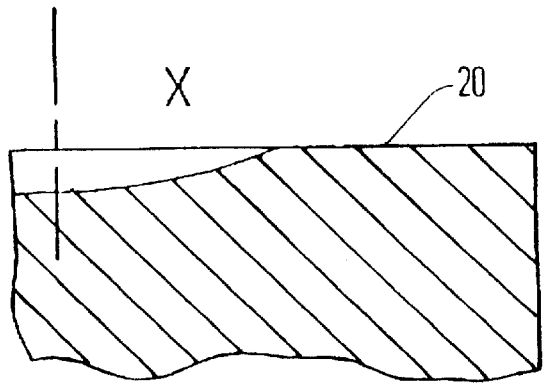
Figure 10E:
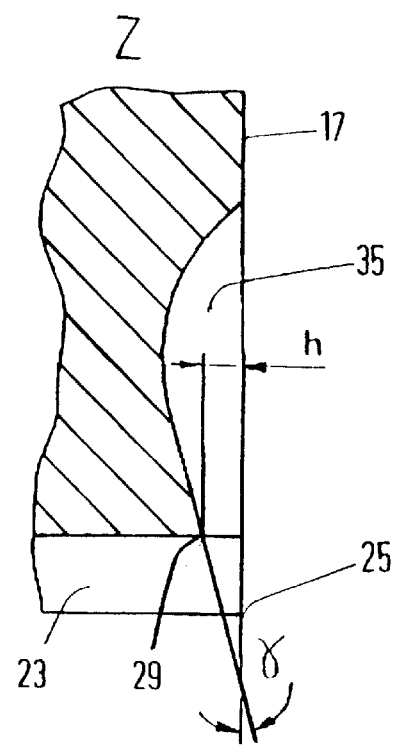
Figure 11B:
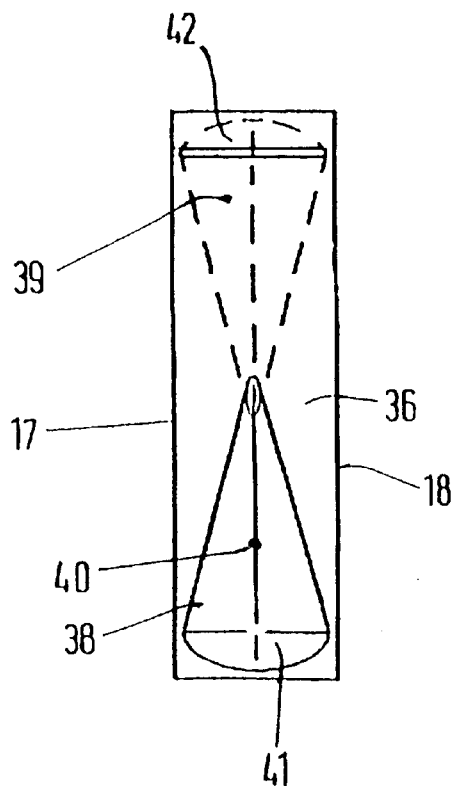
FIG. 11 shows an overhead view and a side view, as shown in FIG. 11B, as well as, in two partial sections shown in FIGS. 11A and 11C, an additional modification of the indexable insert having the basic design illustrated in FIG. 4. Here again, the comments made with regard to FIGS. 2 and 4 relate to the cutting edges illustrated in broken lines.
Figure 11C:
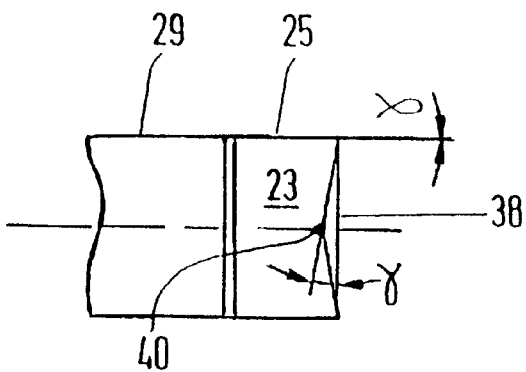

In the embodiment illustrated in FIG. 10, the diameter cutting edges 28, 29 and 30, 31 are positive, while on the other hand, the recessing cutting edges 24, 25 and 26, 27 are negative. The trough-shaped chip forming shoulders 35 of the diameter cutting edges 28, 29 stand in a straight line tapering or inward toward the vicinity of the carrier projections 22, 23 of the recessing cutting edges 24, 25 and 26, 27. The different geometries of recessing cutting edges and of the diameter cutting edges are illustrated by way of example by the partial sections A—A (FIG. 10A) and B—B (FIG. 10B), with the enlargement of A—A in the detail drawing Z (FIG. 10E), using the example of a diameter cutting edge 29 and of the associated recessing cutting edge 25. This exemplary example shows, on the basis of the diameter cutting edge 29, that the diameter cutting edges are graduated or stepped back with respect to the recessing cutting edge in the direction of the main cutting pressure, and namely by the dimension h. The cutting geometry in the vicinity of the carrier projections 22, 23 is illustrated by way of example, with reference to partial section C—C (FIG. 10C), with the enlargement X (FIG. 10D).

The exemplary embodiment illustrated in FIG. 10 is particularly well-suited for materials that throw off long chips,because it promotes chip breaking. This cutting geometry is also suitable for reducing the cutting force and the passive force. An effective active or cutting geometry is achieved by the positive cutting rake on the diameter cutting edges 28, 29 and 30, 31 and by the negative cutting rake, which stabilizes the cut, on the recessing cutting edges 24, 25 and 26, 27.

On the indexable insert illustrated in FIGS. 11, 11A, 11B, and 11C, the carrier projections 22, 23 of the recessing cutting edges 24, 25 and 26, 27 are hollowed out on their outer flanks 36, 37 to form clearance faces. The troughs 38, 39 are in the shape of a V, with the peak 40 of the V lying approximately in the center plane of the cutting plate 9. The depth of the troughs 38, 39 decreases steadily from the carrier projections 22, 23 toward the center of the cutting insert.

The troughs 38, 39 extend to the center of the outside of the cutting insert 9. In a plan view of the outer flanks 36, 37, too, the troughs 38, 39 have a V-shape that opens toward the carrier projections 22, 23 (FIG. 11). The troughs 38, 39 in the clearance faces below the outsides of the recessing cutting edges 24, 25 and 26, 27 are designed to ensure a sufficiently large clearance angle ± α when there are rather flat axial angles of inclination of the cutting insert 9. This feature is used or is necessary if, at the transition from the recessing cutting edge 24, 25 or 26, 27 to the diameter cutting edge 28, 29 or 30, 31, as the result of a transition angle at an insufficiently small or too small clearance angle, a flatter axial angle of inclination is required. The troughs 38, 39 ensure an effective active or cutting geometry with negative cutting rakes on the diameter cutting edges 28–31 and on the recessing cutting edges 24–27.

Additional troughs 41, 42 with a similar V-shape extend inward at an angle 43 toward the previous trough in the vicinity of the clearance faces of the recessing cutting edges 24, 25 or 26, 27.

Figure 5C:
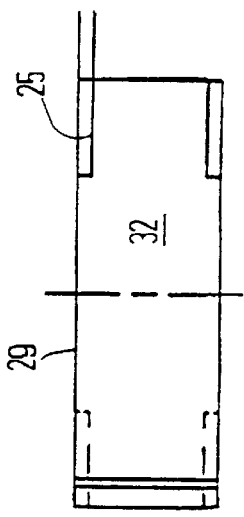
Figure 5:
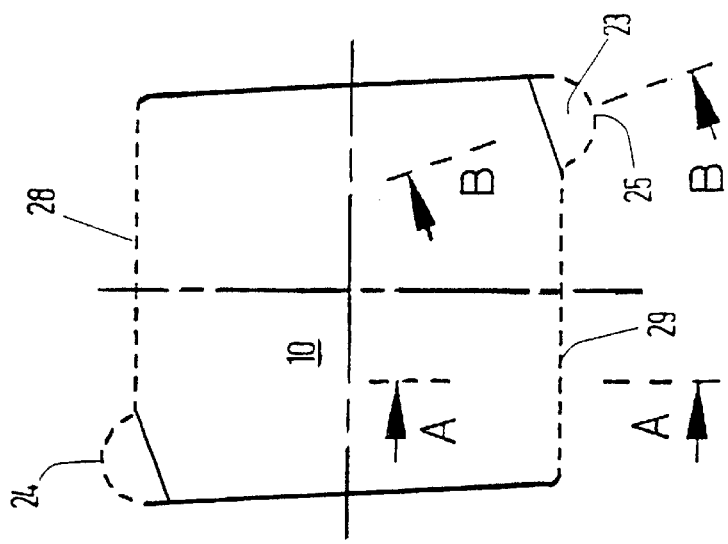
Figure 6:
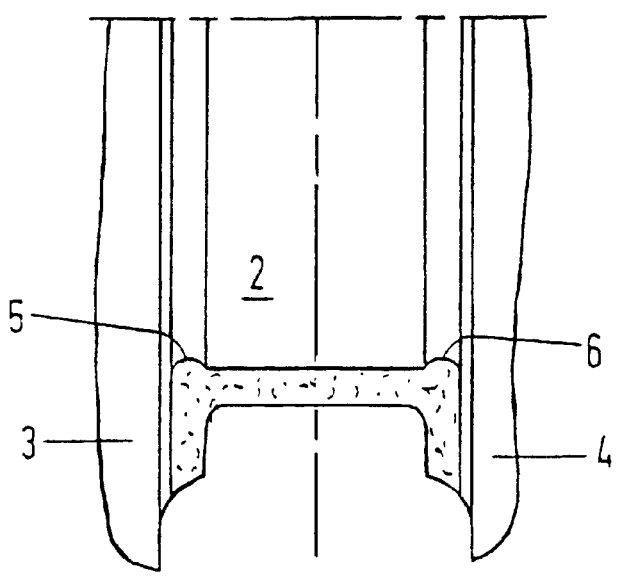
FIG. 6 is a drawing in partial section of the crankshaft journal to be machined by the disk milling cutter in its pre-machining condition, whereby the surface area of the crankshaft journal to be removed by the milling process is highlighted for purposes of the drawing by means of dot-shading.
Figure 7:
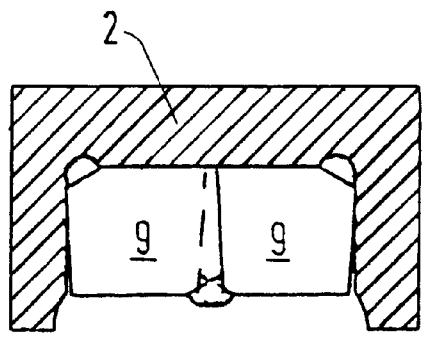
FIG. 7 is a partial section through the crankshaft journal as illustrated in FIG. 6, with indexable inserts of the type illustrated in FIG. 5 shown schematically in their contact position.
Figure 7A:
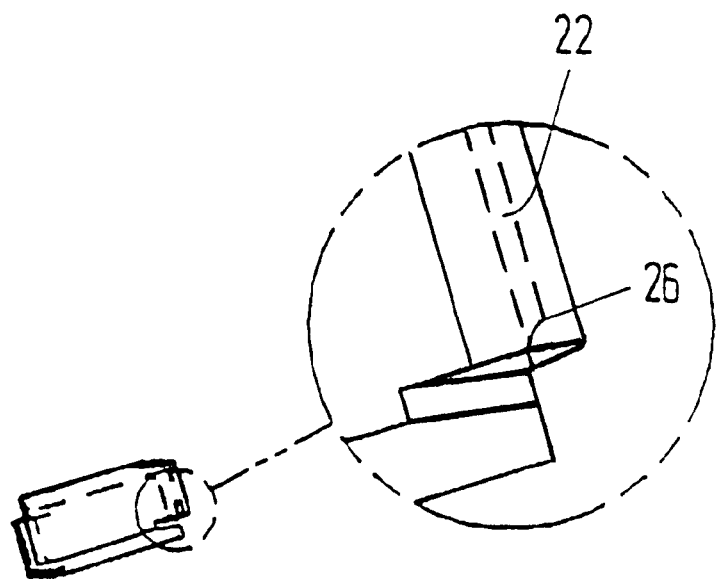
FIGS. 7A and 7B show expanded views of portions of the crankshaft journal shown in FIG. 7.
Figure 7B:
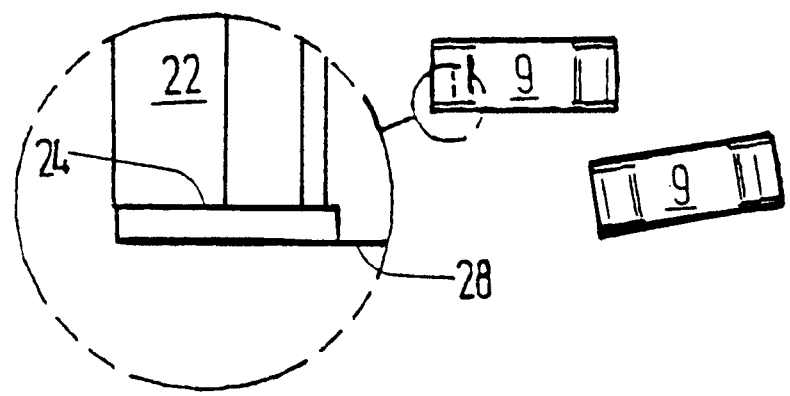

FIGS. 7A and 7B show a partial section through the crankshaft journal as illustrated in FIG. 6, with indexable inserts of the type illustrated in FIG. 5 shown schematically in their contact position.

Figure 8:
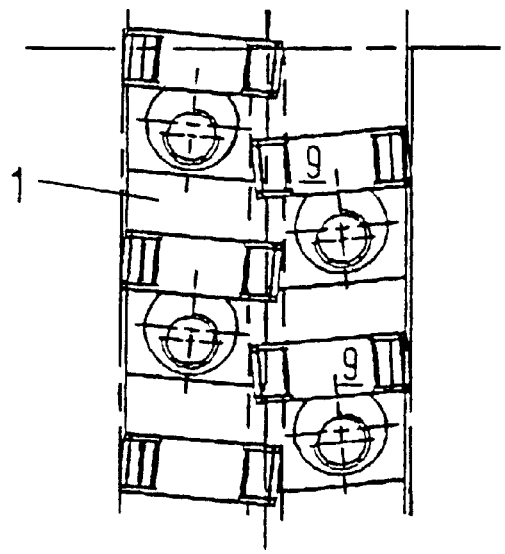
FIG. 8 is a plan view of a peripheral segment of the disk milling cutter, which is equipped or studded with indexable inserts of the type illustrated in FIG. 5, and to achieve a particularly close spacing is provided with an insert clamping device that differs from the arrangement illustrated in FIGS. 1 and 2.

FIG. 8 is a plan view of a peripheral segment of the disk milling cutter, which is equipped or studded with indexable inserts of the type illustrated in FIG. 5. An insert clamping device that differs from the arrangement illustrated in FIGS. 1 and 2 is provided to achieve a particularly close spacing.

One feature of the invention resides broadly in the disk milling cutter 1 for the milling of a crankshaft journal 2, including the two oil collar cheeks 3, 4 associated with it, and with recesses 5, 6 that act as oil grooves between the oil collar cheeks, with plate-shaped cutting inserts 9 on its milling cutter periphery 7 in the peripheral direction 8 on its left and right sides, characterized by the fact that each of the cutting inserts 9 with its cover face 10 containing the chip faces 17, 18 is oriented essentially radially with respect to the axis of the milling cutter, and each shapes one-half of the crankshaft journal 2 with its neighboring oil collar cheeks 3 and 4 respectively as well as the recesses 5 and 6 respectively, whereby these cutting inserts 9 are located on the periphery 7 of the milling cutter, are separated from one another on each side of the milling cutter by one space 12, and are offset with respect to one another on the two sides of the milling cutter by one-half space.

Another feature of the invention resides broadly in the disk milling cutter characterized by the fact that each of the cutting inserts 9 is an indexable insert with at least two cutting edges 15, 16 on the same side of the milling cutter that can be brought into the cutting position one after the other and that each cutting insert 9 is shaped and indexable so that it can be used on the same disk milling cutter 1 both on its left side as well as on its right side.

Yet another feature of the invention resides broadly in the indexable insert for use on a disk milling cutter, in particular characterized by the shape of approximately a cuboid with approximately rhombus-shaped or rhomboid cover faces 10 which contain the chip faces 17, 18, with two carrier lugs 22, 23 diagonally opposite each other, and each with a recessing cutting edge 24, 25 for the recess 5 or 6, whereby the carrier lugs 22, 23 are each an extension of cover face sides that are opposite each other and each of which forms a cutting edge 20, 21, whereby both carrier lugs 22, 23 extend over a portion of the other cutting edges 15, 16 associated with the same cover face 10, each of which cutting edges 15, 16 forms a diameter cutting edge 28, 29, and whereby the carrier lugs 22, 23 of the recessing cutting edges 24, 25 or 26, 27 are hollowed out or have a trough on-their outer flanks 36, 37 to form clearance or tool faces with a positive clearance or tool angle.

Still another feature of the invention resides broadly in the indexable cutting insert characterized by a trough 38, 39 with a V-shaped cross section with the point of the V 40 lying approximately in the center plane of the cutting insert 9.

A further feature of the invention resides broadly in the indexable cutting insert characterized by the fact that the depth of the troughs 38, 39 decreases steadily toward the center of the cutting insert.

Another feature of the invention resides broadly in the indexable cutting insert characterized by the fact that the troughs 38, 39 extend to the center of the outer edge 36, 37 of a cutting insert 9 that supports them.

Yet another feature of the invention resides broadly in the indexable cutting insert characterized by a V-shape of the troughs 38, 39 which, when the cutting insert flanks 36, 37 are viewed from overhead, opens toward the carrier lug 22, 23 of the recessing cutting edges 24, 25 or 26, 27.

Still another feature of the invention resides broadly in the indexable cutting insert characterized by at least one additional trough 41, 42 that runs at an angle 43 with respect to the trough 38, 39 that lies behind it, extends under the carrier lug 22, 23 and tapers in its clearance or tool face.

A further feature of the invention resides broadly in the indexable cutting insert characterized by the fact that the clearance or tool faces 32 of the cutting inserts 9 form a right angle with the cover faces 10 or with the chip faces 17, 18.

Another feature of the invention resides broadly in the indexable cutting insert characterized by the fact that the carrier lug 22, 23 with the recessing cutting edge 24, 25 is stepped with respect to the adjacent diameter cutting edge 28, 29.

Yet another feature of the invention resides broadly in the indexable cutting insert characterized by the fact that the diameter cutting edges 28, 29 and/or the recessing cutting edges 24, 25 are-provided with a chip forming shoulder 33, 35 to form positive cuts.

Still another feature of the invention resides broadly in the indexable cutting insert characterized by a trough-shaped cross section of the chip forming shoulder 33, 35.

A further feature of the invention resides broadly in the indexable cutting insert characterized by the fact that the trough-shaped chip forming shoulders 35 of the diameter cutting edges 28, 29 project inward into the vicinity of the carrier lugs 22, 23 of the recessing cutting edges 24, 25 or 26, 27.

Another feature of the invention resides broadly in the indexable cutting insert characterized by the fact that the diameter cutting edges 28, 29 lie lower in the direction of the main cutting pressure than the recessing cutting edges 24, 25 or 26, 27.

Yet another feature of the invention resides broadly in the cutting insert characterized by the fact that the diameter cutting edges 28, 29 are positive and the recess cutting edges 24, 25 are negative.

One feature of the invention resides broadly in the disk milling cutter 1 equipped with cutting inserts for the milling of a crankshaft journal 2 that can be done in a single feed motion, together with the two oil collar cheeks 3, 4 associated with it, and together with recesses 5, 6 that act as oil grooves between them, which milling disk cutter 1 carries on its periphery 7, alternating in the peripheral direction 8 on its left side and on its right side, plate-shaped cutting inserts 9, which are oriented with their cover faces 10 which contain the chip faces essentially radially with respect to the milling cutter axis, characterized by the fact that the cutting inserts 9 are located on the periphery of the milling cutter 1 with a spacing 12 that is so close or tight that the length 13 of the arc of contact between the beginning of cut and the end of cut of a cutting insert 9 on the workpiece 2 is greater than one-half of the spacing 14 of the layout of the cutting inserts 9 on the periphery of the milling cutter 1.

Another feature of the invention resides broadly in the disk milling cutter, characterized by the fact that the cutting inserts 9 are indexable inserts with at least two cutting edges 15, 16 on the same side of the milling cutter that can be brought into the cutting position one after the other, that each cutting insert 9 is provided with a peripheral contour of its cover faces 10 which contain the chip faces, such that a cutting insert 9 always shapes one-half of the crankshaft journal 2 with its neighboring oil collar cheek 3 or 4 and the recess 5 or 6 in between, and that each cutting insert 9 is shaped and indexable so that it can be used on the same disk milling cutter 1 both on its left side as well as on its right side.

Yet another indexable insert for use on a disk milling cutter, in particular, characterized by the shape of approximately a cuboid with approximately rhombus-shaped or rhomboid cover faces 10 which contain the chip faces 17, 18, of which preferably the cutting insert corners standing in the direction of the longer rhombus diagonal 19 each have, as an extension of two facing cover faces sides each forming a cutting edge 20, 21, have a lug-shaped projection as a carrier of the recessing cutting edge 24, 25 to shape the recess 5, 6, whereby both lugs extend with their width beyond a portion of the two other cutting edges 15, 16 associated with the same cover face 10 and each forming a diameter cutting edge 28, 29 or 30, 31.

Still another feature of the invention resides broadly in the cutting insert, characterized by the fact that the clearance or tool faces 32 of the cutting inserts 9 form a right angle with the cover faces 10 or with the chip faces 17, 18.

A further feature of the invention resides broadly in the cutting insert, characterized by the fact that the carrier lug 22, 23 with the recessing cutting edge 24, 25 or 26, 27 is stepped with respect to the adjacent diameter cutting edge 28, 29 or 30, 31.

Another feature of the invention resides broadly in the cutting insert, characterized by the fact that the diameter cutting edges 28, 29 or 30, 31 and/or the recessing cutting edges 24, 25 or 26, 27 are provided with a chip forming shoulder 33 to form positive cuts.

Yet another feature of the invention resides broadly in the cutting insert, characterized by a trough-shaped cross section of the chip forming shoulder 33.

Still another feature of the invention resides broadly in the cutting insert, characterized by the fact that only the diameter cutting edges 28, 29 or 30, 31 are positive, but the recessing cutting edges 24, 25 or 26, 27 are negative.

A further feature of the invention resides broadly in the cutting insert, characterized by the fact that the trough-shaped chip forming shoulders 35 of the diameter cutting edges 28, 29 or 30, 31 project inward into the vicinity of the carrier lugs 22, 23 of the recessing cutting edges 24, 25 or 26, 27.

Another feature of the invention resides broadly in the cutting insert, characterized by the fact that the diameter cutting edges 28, 29 or 30, 31 lie lower in the direction of the main cutting pressure than the recessing cutting edges 24, 25 or 26, 27.

Yet another feature of the invention resides broadly in the cutting insert, characterized by the fact that the carrier lugs 22, 23 of the recessing cutting edges 24, 25 or 26, 27 are hollowed out or have a trough on their outer flanks 36, 37 to form clearance or tool faces with a positive clearance or tool angle.

Still another feature of the invention resides broadly in the cutting insert, characterized by a trough 38, 39 with a V-shaped cross section with the point of the V 40 lying approximately in the center plane of the cutting insert 9.

A further feature of the invention resides broadly in the cutting insert, characterized by the fact that the depth of the troughs 38, 39 decreases steadily toward the center of the cutting insert.

Another feature of the invention resides broadly in the cutting insert, characterized by the fact that the troughs 38, 39 extend to the center of the outer edge 36, 37 of a cutting insert 9 that supports them.

Yet another feature of the invention resides broadly in the cutting insert, characterized by
a V-shape of the troughs 38, 39 which, when the cutting insert flanks 36, 37 are viewed from overhead, opens toward the carrier lug 22, 23 of the recessing cutting edges 24, 25 or 26, 27.

Still another feature of the invention resides broadly in the cutting insert,
characterized by
at least one additional trough 41, 42 that runs at an angle 43 with respect to the trough 38, 39 that lies behind it, extends under the carrier lug 22, 23 and tapers in its clearance or tool face.

A further feature of the invention resides broadly in a method for milling with a disk milling cutter a crankshaft journal including the two oil collar cheeks associated with it, as well as the recesses that act as oil grooves between the oil collar cheeks, which disk milling cutter having plate-shaped cutting inserts on its milling cutter periphery disposed in the peripheral direction on its left and right sides, said method comprising the steps of: measuring a diameter of the crankshaft journal; determining a desired depth of the milling cuts for the crankshaft journal; determining a diameter of the disk milling cutter relative to the diameter of the crankshaft journal and the desired depth of the milling cuts; positioning the cutting inserts on the periphery of the disk milling cutter; said step of positioning the cutting inserts further comprising: positioning the cutting inserts radially with respect to the axis of the disk milling cutter; alternating the cutting inserts on the left and right sides about the periphery of the disk milling cutter in a direction of rotation of the disk milling cutter; determining a spacing between each of the cutting inserts relative to the diameter of the crankshaft journal, the desired depth of the cut, and the diameter of the disk milling cutter; positioning the cutting inserts with the spacing between each of the cutting inserts located on the right side of the periphery of the disk milling cutter; positioning the cutting inserts with the spacing between each of the cutting inserts located on the left side of the periphery of the disk milling cutter; and positioning the cutting inserts so that the spacing between each alternating left-side and right-side cutting insert is one half the distance of the spacing between adjacent cutting inserts on the left side or the right side; rotating the disk milling cutter and the crankshaft in the same direction of rotation; engaging the crankshaft with a first cutting insert upon rotation of the disk milling cutter, said step of engaging the crankshaft with the first cutting insert comprising: contacting the crankshaft to cut said crankshaft by applying a cutting load force to said crankshaft; engaging the crankshaft over a predetermined arc of rotation, which arc of rotation is greater in length than the length of one-half of the spacing; and disengaging from the crankshaft upon completion of the arc of rotation; engaging the crankshaft with a second cutting insert, which cutting insert follows the first cutting insert in the direction of rotation of the disk milling cutter, said step of engaging the crankshaft with the second insert comprising: contacting the crankshaft to cut said crankshaft by applying a cutting load force to said crankshaft; engaging the crankshaft over a predetermined arc of rotation, which arc of rotation is greater in length than the length of one-half of the spacing; and disengaging from the crankshaft upon completion of the arc of rotation; said step of engaging the crankshaft with the second cutting insert begins as the first cutting insert begins disengaging from said crankshaft, whereby the cutting load force applied by the second cutting insert during engagement increases at a rate substantially equivalent to the rate at which the cutting load force applied by the first cutting insert decreases during disengagement; and applying a substantially constant cutting load force throughout the milling process to produce milling cuts having the desired depth in the crankshaft.

Some examples of milling cutters and components thereof which may be utilized or adapted for use in at least one embodiment of the present invention may be found in the following U.S. Pat. No. 5,454,671, issued on Oct. 3, 1995 to inventor Qvarth; No. 5,071,291, issued on Dec. 10, 1991 to inventor Kaminski; No. 4,488,839, issued on Dec. 18, 1984 to inventors Wermeister, et al.; No. 6,004,080, issued on Dec. 21, 1999 to inventors Qvarth, et al.; No. 5,810,517, issued on Sep. 22, 1998 to inventor Bostic; No. 5,593,255, issued on Jan. 14, 1997 to inventors Satran, et al.; No. 4,285,618, issued on Aug. 25, 1981 to inventor Shanley, Jr.; No. 5,984,599, issued on Nov. 16, 1999 to inventor Janssen; No. 5,707,187, issued on Jan. 13, 1998 to inventor Arnold; No. 5,551,814, issued on Sep. 3, 1996 to inventor Hazama; No. 4,444,533, issued on Apr. 24, 1984 to inventors Riley, et al.; and No. 4,326,323, issued on Apr. 27, 1982 to inventors Kralowetz, et al.

The following patents, patent applications, or publications were cited in the International Search Report for International Patent Application No. PCT/EP98/05374, and are hereby incorporated by reference as if set forth in their entirety herein: International Application WO 96/39269; European Application EP 0 156 780 A; and Federal Republic of Germany Application DE 195 19 951.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 197 39 366.7, filed on Sep. 9, 1997, having inventors Gebhard Muller and Horst Jager, and DE-OS 197 39 366.7 and DE-PS 197 39 366.7 and International Application No. PCT/EP98/05374 as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. Method for milling with a disk milling cutter a crankshaft journal including the two oil collar cheeks associated with it, as well as the recesses that act as oil grooves between the oil collar cheeks, which disk milling cutter having plate-shaped cutting inserts on its milling cutter periphery disposed in the peripheral direction on its left and right sides, said method comprising the steps of:

measuring a diameter of the crankshaft journal;

determining a desired depth of the milling cuts for the crankshaft journal;

determining a diameter of the disk milling cutter relative to the diameter of the crankshaft journal and the desired depth of the milling cuts;

positioning the cutting inserts on the periphery of the disk milling cutter;

said step of positioning the cutting inserts further comprising:

positioning the cutting inserts radially with respect to the axis of the disk milling cutter;

alternating the cutting inserts on the left and right sides about the periphery of the disk milling cutter in a direction of rotation of the disk milling cutter;

determining a spacing between each of the cutting inserts relative to the diameter of the crankshaft journal, the desired depth of the cut, and the diameter of the disk milling cutter;

positioning the cutting inserts with the spacing between each of the cutting inserts located on the right side of the periphery of the disk milling cutter;

positioning the cutting inserts with the spacing between each of the cutting inserts located on the left side of the periphery of the disk milling cutter; and positioning the cutting inserts so that the spacing between each alternating left-side and right-side cutting insert is one half the distance of the spacing between adjacent cutting inserts on the left side or the right side; rotating the disk milling cutter and the crankshaft in the same direction of rotation;

engaging the crankshaft with a first cutting insert upon rotation of the disk milling cutter, said step of engaging the crankshaft with the first cutting insert comprising:

contacting the crankshaft to cut said crankshaft by applying a cutting load force to said crankshaft;

engaging the crankshaft over a predetermined arc of rotation, which arc of rotation is greater in length than the length of one-half of the spacing; and disengaging from the crankshaft upon completion of the arc of rotation;

engaging the crankshaft with a second cutting insert, which cutting insert follows the first cutting insert in the direction of rotation of the disk milling cutter, said step of engaging the crankshaft with the second insert comprising:

contacting the crankshaft to cut said crankshaft by applying a cutting load force to said crankshaft;

engaging the crankshaft over a predetermined arc of rotation, which arc of rotation is greater in length than the length of one-half of the spacing; and disengaging from the crankshaft upon completion of the arc of rotation;

said step of engaging the crankshaft with the second cutting insert begins as the first cutting insert begins disengaging from said crankshaft, whereby the cutting load force applied by the second cutting insert during engagement increases at a rate substantially equivalent to the rate at which the cutting load force applied by the first cutting insert decreases during disengagement; and applying a substantially constant cutting load force throughout the milling process to produce milling cuts having the desired depth in the crankshaft.

2. Method for milling with a disk milling cutter a crankshaft journal including the two oil collar cheeks associated with it, as well as the recesses that act as oil grooves between the oil collar cheeks, which disk milling cutter having plate-shaped cutting inserts on its milling cutter periphery disposed in the peripheral direction on its left and right sides, said method comprising the steps of:

measuring a diameter of the crankshaft journal;

determining a desired depth of the milling cuts for the crankshaft journal;

determining a diameter of the disk milling cutter relative to the diameter of the crankshaft journal and the desired depth of the milling cuts;

positioning the cutting inserts on the periphery of the disk milling cutter;

said step of positioning the cutting inserts further comprising:

positioning the cutting inserts radially with respect to the axis of the disk milling cutter;

alternating the cutting inserts on the left and right sides about the periphery of the disk milling cutter in a direction of rotation of the disk milling cutter;

determining a spacing between each of the cutting inserts relative to the diameter of the crankshaft journal, the desired depth of the cut, and the diameter of the disk milling cutter;

positioning the cutting inserts with the spacing between each of the cutting inserts located on the right side of the periphery of the disk milling cutter;

positioning the cutting inserts with the spacing between each of the cutting inserts located on the left side of the periphery of the disk milling cutter; and positioning a first cutting insert and a second cutting insert, such that the second cutting insert begins engaging the crankshaft while the first cutting insert is disengaging from the crankshaft;

rotating the disk milling cutter and the crankshaft in the same direction of rotation;

engaging the crankshaft with a first cutting insert upon rotation of the disk milling cutter;

engaging the crankshaft with a second cutting insert, which second cutting insert follows the first cutting insert in engagement of the crankshaft; and said step of engaging the crankshaft with the second cutting insert begins while the first cutting insert is disengaging from the crankshaft, thereby applying a substantially constant cutting load force throughout the milling process to produce milling cuts having the desired depth in the crankshaft.

3. The method for milling with a disk milling cutter a crankshaft journal according to claim 2, wherein the step of applying a substantially constant cutting load force comprises applying a cutting load force with the second cutting insert, which cutting load force during engagement increases at a rate substantially equivalent to a rate at which the cutting load force being applied by the first cutting insert decreases during disengagement.

4. A crankshaft journal disk milling cutter arrangement for the milling of: a crankshaft journal; two oil collar cheeks of said crankshaft journal; and recesses that act as oil grooves between the oil collar cheeks; said disk milling cutter arrangement comprising:

a disk;

a plurality of plate-shaped cutting inserts being configured to be inserted into said disk;

said disk and said inserts together being configured to mill a crankshaft journal;

each of said plurality of cutting inserts comprising a cover face being configured to be disposed substantially radially with respect to the rotational axis of the milling cutter;

said cover face comprising chip faces;

said chip faces being configured to cut said crankshaft journal to shape said crankshaft journal, said two oil collar cheeks, and said oil groove recesses;

said disk comprising a plurality of insertion openings each being configured to receive and hold a corresponding one of said plurality of cutting inserts;

said insertion openings being disposed on the periphery of said disk in the peripheral direction;

said plurality of insertion openings comprising a first plurality of insertion openings and a second plurality of insertion openings;

said insertion openings of said first plurality and said insertion openings of said second plurality being disposed on opposite sides of the periphery of said disk such that said cutting inserts of said first plurality of insertion openings shape one-half of said crankshaft journal, and said cutting inserts of said second plurality of insertion openings shape the other half of said crankshaft journal;

each insertion opening of said first plurality being separated from one another by a predetermined distance;

each insertion opening of said second plurality being separated from one another by said predetermined distance; and each insertion opening of said first plurality being offset with respect to a corresponding insertion opening of said second plurality by one-half of said predetermined distance.

5. The disk milling cutter according to claim 4, wherein:

each of said cutting inserts is an interchangeable insert comprising at least two cutting edges disposed immediately adjacent the milling cutter;

said at least two cutting edges are configured to be brought into a cutting position one after the other; and each of said cutting inserts is configured to be inserted into either one of said first plurality of insertion openings or said second plurality of insertion openings.

6. The disk milling cutter according to claim 4, wherein:

each of said cutting inserts is substantially cube-shaped;

said cover face of each of said cutting inserts is substantially rhombus-shaped; and said substantially rhombus-shaped cover face of each of said cutting inserts comprises:

a first side cutting edge and a second side cutting edge disposed opposite said first side cutting edge;

a first diameter cutting edge and a second diameter cutting edge disposed opposite said first diameter cutting edge;

each of said side cutting edges being disposed transverse to each of said diameter cutting edges;

each of said first diameter cutting edge and said second diameter cutting edge comprising a projection disposed immediately adjacent a corresponding one of said first side cutting edge and said second side cutting edge;

said projection of said first diameter cutting edge is disposed diagonally opposite said projection of said second diameter cutting edge;

each of said projections comprises a recess cutting face configured to cut said oil groove recesses in said crankshaft journal; and each of said recess cutting edges are hollowed out or have a trough on their outer flanks to form clearance faces with a positive clearance angle.

7. The disk milling cutter according to claim 5, wherein:

each of said cutting inserts is substantially cube-shaped;

said cover face of each of said cutting inserts is substantially rhombus-shaped; and said substantially rhombus-shaped cover face of each of said cutting inserts comprises:

a first side cutting edge and a second side cutting edge disposed opposite said first side cutting edge;

a first diameter cutting edge and a second diameter cutting edge disposed opposite said first diameter cutting edge;

each of said side cutting edges being disposed transverse to each of said diameter cutting edges;

each of said first diameter cutting edge and said second diameter cutting edge comprising a projection disposed immediately adjacent a corresponding one of said first side cutting edge and said second side cutting edge;

said projection of said first diameter cutting edge is disposed diagonally opposite said projection of said second diameter cutting edge;

each of said projections comprises a recess cutting edge configured to cut said oil groove recesses in said crankshaft journal; and each of said recess cutting edges are hollowed out or have a trough on their outer flanks to form clearance faces with a positive clearance angle.

8. The disk milling cutter according to claim 7, wherein:

each of said cutting inserts comprises a first side face and a second side face disposed opposite said first side face, each of which side faces is disposed transverse to said cover face; and each of said side faces comprises a trough having a V-shaped cross section with the point of the V lying substantially in the center plane of the cutting insert.

9. The disk milling cutter according to claim 8, wherein:

the depth of said trough decreases steadily toward the point of the V adjacent the center of the cutting insert.

10. The disk milling cutter according to claim 9, wherein:

said trough extends to the center of the outer edge of its corresponding cutting insert.

11. The disk milling cutter according to claim 10, wherein:

said V-shaped trough opens toward its corresponding recess cutting edge.

12. The disk milling cutter according to claim 11, wherein:
- each of said cutting inserts comprises at least one additional trough; and
- said additional trough runs at an angle with respect to said trough that lies behind it, extends under said projection, and tapers to form a tool face.

13. The disk milling cutter according to claim 12, wherein:
- said clearance faces of said cutting inserts form a right angle with one of: said cover faces and said chip faces.

14. The disk milling cutter according to claim 13, wherein:
- said projection is stepped with respect to its adjacent corresponding one of said diameter cutting edges.

15. The disk milling cutter according to claim 14, wherein:
- each of at least one of said diameter cutting edges and recess cutting edges comprise a chip forming shoulder to form positive cuts; and
- said chip-forming shoulder has a trough-shaped cross-section.

16. The disk milling cutter according to claim 15, wherein:
- said chip forming shoulders of said diameter cutting edges project inward into the vicinity of a corresponding one of said projections.

17. The disk milling cutter according to claim 16, wherein:
- said diameter cutting edges lie lower in the direction of the main cutting pressure than said recessing cutting edges.

18. The disk milling cutter according to claim 17, wherein:
- said diameter cutting edges are positive and said recess cutting edges are negative.

19. A crankshaft journal disk milling cutter arrangement for the milling of: a crankshaft journal; two oil collar cheeks of said crankshaft journal; and recesses that act as oil grooves between the oil collar cheeks; said disk milling cutter arrangement comprising:
- a disk;
- a plurality of plate-shaped cutting inserts each being configured to be inserted into said disk and each being configured to engage said crankshaft journal during a milling process;
- said disk and said inserts together being configured to mill a crankshaft journal;
- each of said plurality of cutting inserts comprising a cover face being configured to be disposed substantially radially with respect to the rotational axis of the milling cutter;
- said cover face comprising chip faces;
- said chip faces being configured to cut said crankshaft journal to shape said crankshaft journal, said two oil collar cheeks, and said recesses;
- said disk comprising a plurality of insertion openings each being configured to receive and hold a corresponding one of said plurality of cutting inserts;
- said insertion openings being disposed on the periphery of said disk in the peripheral direction;
- said plurality of insertion openings comprising a first plurality of insertion openings and a second plurality of insertion openings;
- said insertion openings of said first plurality and said insertion openings of said second plurality being disposed on opposite sides of the periphery of said disk to permit said cutting inserts of said first plurality of insertion openings to shape one-half of said crankshaft journal, and said cutting inserts of said second plurality of insertion openings to shape the other half of said crankshaft journal;
- each insertion opening of said first plurality being separated from one another by a predetermined distance, which distance being determined relative to a diameter of said crankshaft journal, a desired depth of cut, and a diameter of said disk;
- each insertion opening of said second plurality being separated from one another by said predetermined distance;
- each insertion opening of said first plurality being disposed offset with respect to a corresponding insertion opening of said second plurality by one-half of said predetermined distance to permit engagement of a first cutting insert of said first plurality of insertion openings with said crankshaft journal before engagement of a second cutting insert of said second plurality of insertion openings with said crankshaft journal upon rotation of said disk milling cutter, and to permit the engagement of said second cutting insert with said crankshaft journal to begin substantially upon disengagement of said first cutting insert from said crankshaft journal to permit generation of a substantially constant cutting load force throughout a milling process to produce milling cuts having the desired depth in said crankshaft journal.

20. The disk milling cutter according to claim 19, wherein:
- said first cutting insert and said second cutting insert are each configured and disposed to generate a cutting load force during engagement, wherein the cutting load force generated by said second cutting insert has a rate of increase substantially equivalent to a rate of decrease of the cutting load force generated by said first cutting insert during a milling process.

* * * * *

UNITED STATES PATENT AND TRADEMARK OFFICE
CERTIFICATE OF CORRECTION

PATENT NO.   : 6,374,712 B1
DATED        : April 23, 2002
INVENTOR(S)  : Gebhard Müller and Horst Jager It is certified that error appears in the above-identified patent and that said Letters Patent is hereby corrected as shown below:

<u>Column 4,</u>
Line 17, after "side", delete "view" and insert -- view, shown in Fig. 5C, --.

<u>Column 7,</u>
Line 39, after "FIGS." insert -- 7, --.

Signed and Sealed this

Fourteenth Day of January, 2003

JAMES E. ROGAN
*Director of the United States Patent and Trademark Office*